US012542350B2

(12) United States Patent
Lo et al.

(10) Patent No.: US 12,542,350 B2
(45) Date of Patent: Feb. 3, 2026

(54) ANTENNA STRUCTURE FOR INCREASING ISOLATION

(71) Applicant: ARCADYAN TECHNOLOGY CORPORATION, Hsinchu (TW)

(72) Inventors: Kuo-Chang Lo, Hsinchu (TW); Chih-Yung Huang, Hsinchu (TW)

(73) Assignee: ARCADYAN TECHNOLOGY CORPORATION, Hsinchu (TW)

( * ) Notice: Subject to any disclaimer, the term of this patent is extended or adjusted under 35 U.S.C. 154(b) by 2 days.

(21) Appl. No.: 18/664,571

(22) Filed: May 15, 2024

(65) Prior Publication Data

US 2024/0387989 A1 Nov. 21, 2024

(30) Foreign Application Priority Data

May 16, 2023 (TW) ................................ 112118201

(51) Int. Cl.
*H01Q 1/52* (2006.01)
*H01Q 1/48* (2006.01)

(52) U.S. Cl.
CPC ............... *H01Q 1/521* (2013.01); *H01Q 1/48* (2013.01); *H01Q 1/52* (2013.01); *H01Q 1/523* (2013.01)

(58) Field of Classification Search
CPC .......... H01Q 1/521; H01Q 1/52; H01Q 1/523; H01Q 1/48
See application file for complete search history.

(56) References Cited

U.S. PATENT DOCUMENTS

| | | | | |
|---|---|---|---|---|
| 9,379,432 | B2 * | 6/2016 | Ishikawa ................ | H01Q 21/28 |
| 2008/0204347 | A1 * | 8/2008 | Alvey .................... | H01Q 1/523<br>343/841 |
| 2017/0085007 | A1 * | 3/2017 | Wu ........................ | H01Q 1/521 |
| 2017/0229780 | A1 * | 8/2017 | Huang ................. | H01Q 9/0421 |
| 2021/0126355 | A1 * | 4/2021 | Chuang .................. | H01Q 1/243 |
| 2022/0336958 | A1 * | 10/2022 | Hwang .................. | H01Q 13/10 |

* cited by examiner

*Primary Examiner* — Hai V Tran

(57) ABSTRACT

An antenna structure includes a ground surface, a first antenna, a second antenna, and a printed-type guiding structure located between the first antenna and the second antenna. The first antenna, the second antenna, and the printed-type guiding structure are electrically connected to the ground surface. The printed-type guiding structure includes a first hollow portion, a second hollow portion, and a protruding portion. The angle between the axes of the two hollow portions is 30°-50°. The protruding portion is disposed between the external of the first side of the first hollow portion and the interior of the first side of the second hollow portion. The second hollow portion has a short arm on the first side and a long arm on the second side. The total length of the short arm and the long arm is 0.2-0.3 times the operating frequency wavelength.

10 Claims, 7 Drawing Sheets

ANTENNA STRUCTURE FOR INCREASING ISOLATION

CROSS-REFERENCE TO RELATED APPLICATION

This application claims the priority of Taiwanese patent application No. 112118201, filed on May 16, 2023, which is incorporated herewith by reference.

BACKGROUND OF THE INVENTION

1. Field of the Invention

The present invention relates generally to an antenna structure and, more particularly, to an antenna structure for increasing isolation.

2. The Prior Arts

Wireless communication devices generally perform wireless communication through an antenna. With the trend of miniaturization of wireless communication devices, the size of antennas is also getting smaller and smaller. To increase the communication quality, the more antennas, the better. However, the small size and large number of antennas result in a relatively short distance between the antennas, and the signals of these antennas interfere with each other.

In a first conventional antenna structure, a plurality of antennas and a plurality of conductor ground isolation objects are arranged on the ground portion of the carrier plate, and the conductor ground isolation objects are respectively close to the inner sides of the antennas so as to increase the isolation. However, these conductor ground isolation objects are integrally stamped or welded through a mold, so the structure is often complicated, and the manufacturing cost is relatively high.

A second conventional antenna structure includes a first antenna, a second antenna, and a neutral wire, and the neutral wire is electrically connected to the first antenna and the second antenna, thereby increasing the first antenna isolation from the second antenna. However, the structure of the second conventional antenna structure is complicated, the manufacturing cost is high, and the isolation can only reach about −25 dB, which is not as good as expected.

A third conventional antenna structure includes a first antenna, a second antenna, and a third antenna. The first antenna includes a radiator, a feed-in board, a signal feed-in element, and a metal arm. The metal arm can guide the reflected signal of the signal emitted by the second antenna and the third antenna to the metal arm so as to increase the antenna isolation between the first antenna and the second antenna and increase the antenna isolation between the first antenna and the third antenna. However, the structure of the third conventional antenna structure is quite complicated, the manufacturing cost is high, and the isolation degree can only reach about −25 dB, which is not as good as expected.

SUMMARY OF THE INVENTION

A primary objective of the present invention is to provide an antenna structure that can increase the isolation, which can greatly increase the isolation between the first antenna and the second antenna and improve the flexibility of antenna placement design.

Another objective of the present invention is to provide an antenna structure that can increase isolation and reduce manufacturing costs.

In order to achieve the foregoing objectives, the present invention provides an antenna structure for increasing isolation, including a ground surface, a first antenna, a second antenna, and a printed-type guiding structure.

The first antenna is electrically connected to the ground surface.

The second antenna is electrically connected to the ground surface.

The printed-type guiding structure is located between the first antenna and the second antenna, electrically connected to the ground surface, and includes a first hollow portion, a second hollow portion, and a protruding portion, the first hollow portion has an axis, a first end, a second end, a first side, and a second side, the second end of the first hollow portion is located at the opposite end of the first end of the first hollow portion, and the second side of the first hollow portion is located on the opposite side of the first side of the first hollow portion; the second hollow portion has an axis, a first end, a second end, a first side, and a second side, the second end of the second hollow portion is located at the opposite end of the first end of the second hollow portion, and the second side of the second hollow portion is located on the opposite side of the first side of the second hollow portion; the first hollow portion and the second hollow portion are parallelograms, the axis of the first hollow portion and the second hollow portion form an angle between 30° and 50°, and the first end of the first hollowed portion overlaps with the first end of the second hollowed portion, and the protruding portion is disposed between the outer side of the first side of the first hollow portion and the inner side of the first side of the second hollow portion.

Wherein, the first side of the second hollow portion has a short arm, the short arm extends from the protruding portion to the second end of the second hollow portion, and the second side of the second hollow portion has a long arm, the long arm extends from the first end of the second hollow portion to the second end of the second hollow portion, a total length of the short arm and the long arm is 0.2 to 0.3 times the wavelength of the operating frequency band.

In a preferred embodiment, the total length of the short arm and the long arm is 0.25 times the wavelength of the operating frequency band.

In a preferred embodiment, the range of 0.25 times the wavelength of the operating frequency band is between 22 mm and 30 mm.

In a preferred embodiment, 0.25 times the wavelength of the operating frequency band is 24 mm.

In a preferred embodiment, the length ratio of the short arm to the long arm is 2:3.

In a preferred embodiment, the protruding portion is trapezoidal or triangular.

In a preferred embodiment, the angle between the axis of the first hollow portion and the axis of the second hollow portion is 45 degrees.

In a preferred embodiment, a width of the first hollow portion is between 6 mm and 10 mm.

In a preferred embodiment, a length of the first hollow portion is between 9 mm and 11 mm.

In a preferred embodiment, the printed-type guiding structure includes a first metal arm and a second metal arm, the first metal arm is electrically connected to the ground surface, and the second metal arm is electrically connected to the ground surface; the first hollow portion and the second hollow portion are formed between the first metal arm and the second metal arm, and the protruding portion is arranged on the inner side of the second metal arm and close to the first end of the second metal arm.

The effect of the present invention is that the antenna structure of the present invention can greatly increase the isolation between the first antenna and the second antenna through the structural configuration of the printed-type guiding structure, preventing the first antenna and the second antenna from interference by the transmitted signals, shortening the required distance between the first antenna and the second antenna, and improving the flexibility of antenna placement design.

Moreover, the present invention only needs to use printing technology to form a printed-type guiding structure on the printed circuit board, the effect of greatly increasing the isolation between the first antenna and the second antenna can be achieved, there is no need to add an additional three-dimensional structure, and no mold manufacturing is required, thereby effectively reducing manufacturing costs.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
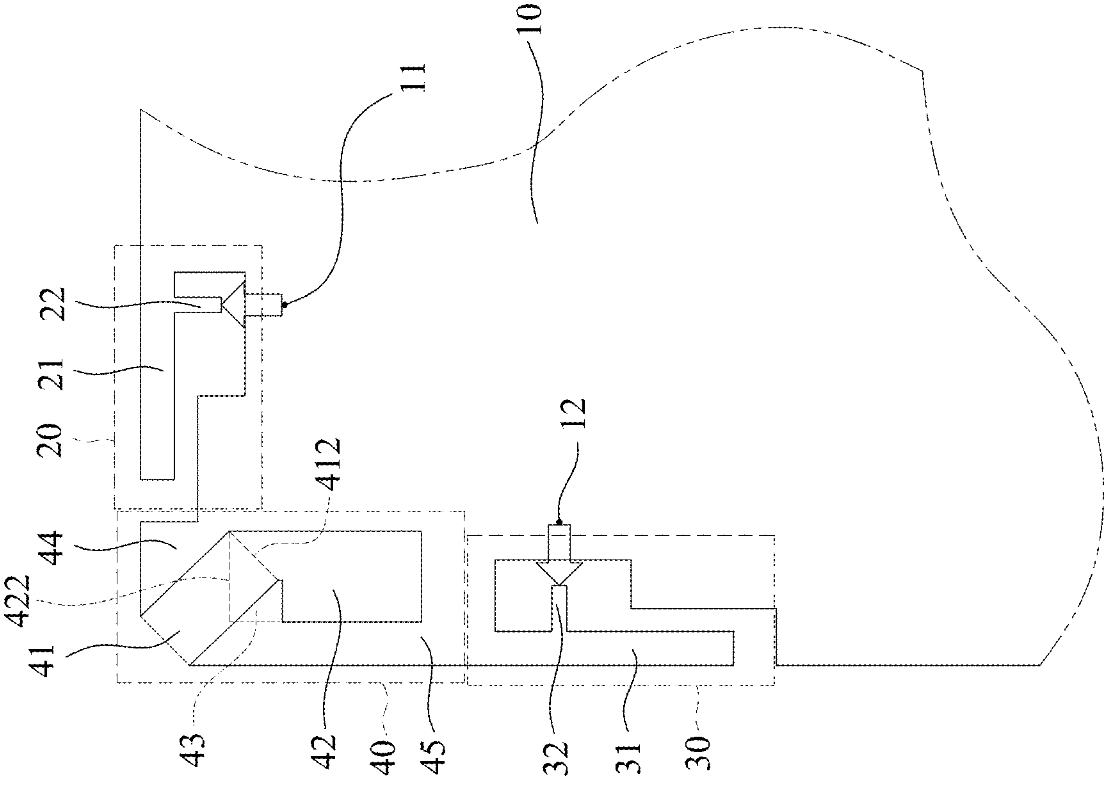
FIG. 1 is a structural schematic view of the antenna structure of the present invention.
Figure 2:
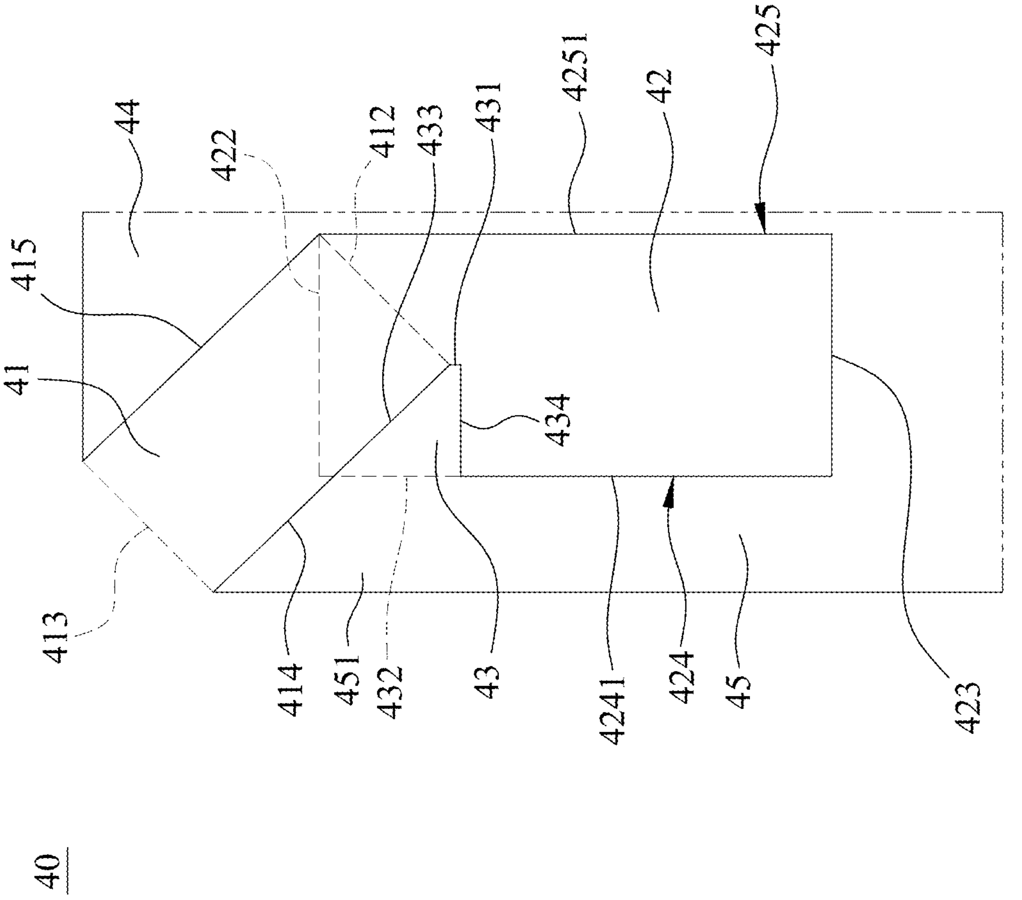
FIG. 2 is a structural schematic view of a preferred embodiment of the printed-type guiding structure of the present invention.
Figure 3:
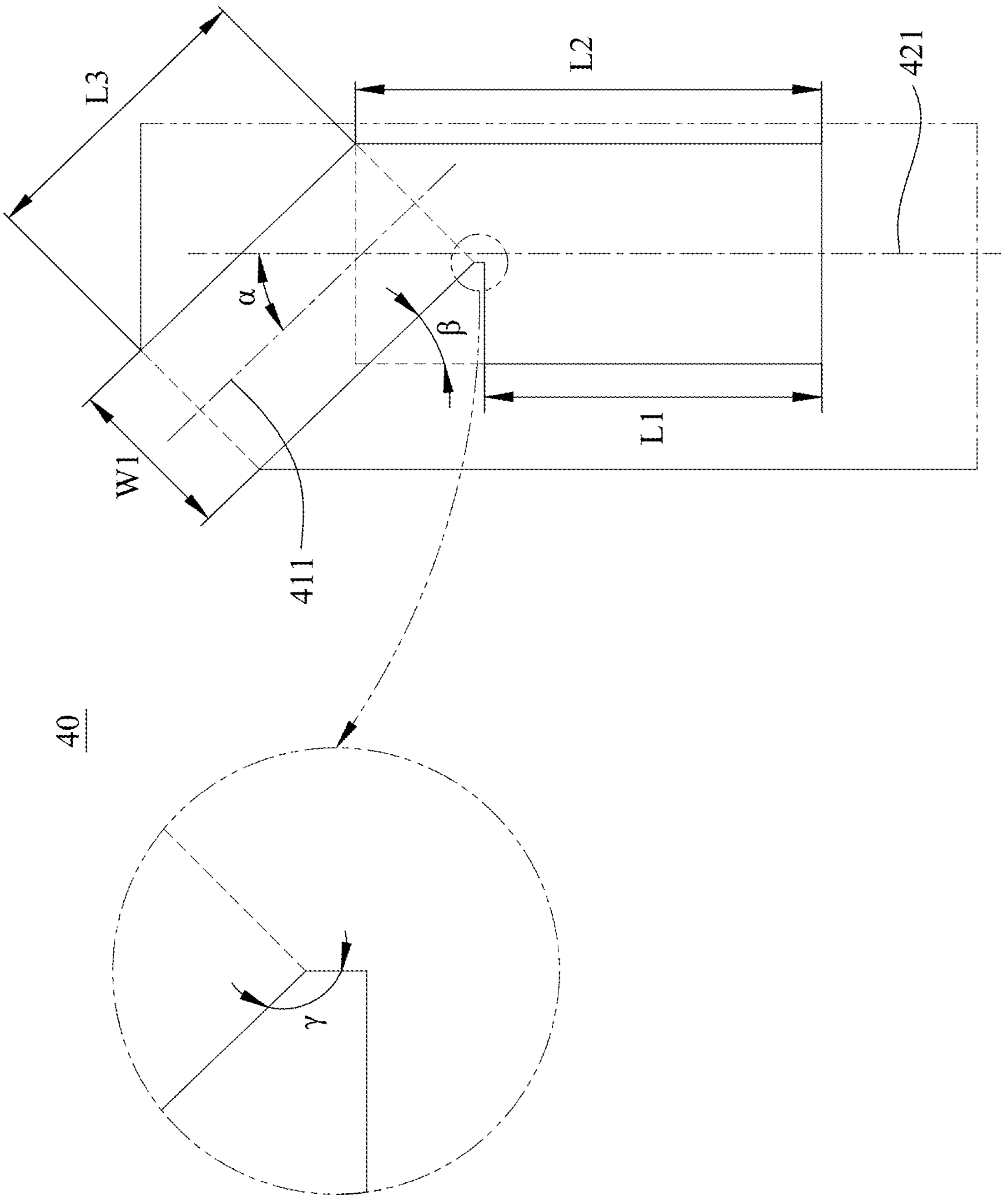
FIG. 3 is a schematic view of the relationship of length, width, and angle of a preferred embodiment of the printed-type guiding structure of the present invention.

FIG. 1 is a schematic view of an antenna structure of the present invention, FIG. 2 is a schematic structural view of a preferred embodiment of a printed-type guiding structure 40 of the present invention, and FIG. 3 is a schematic view of a preferred embodiment of a printed-type guiding structure 40 of the present invention, with the relationship between length L1-L3, width W1, and angle α. The present invention provides an antenna structure for increasing isolation, which includes a ground surface 10, a first antenna 20, a second antenna 30, and a printed-type guiding structure 40.

As shown in FIG. 1, the ground surface 10 is a part of a printed circuit board that can extend freely. The ground surface 10 has a first radio frequency (RF) feed-in signal terminal 11 and a second RF feed-in signal terminal 12.

As shown in FIG. 1, the first antenna 20 includes a first radiator 21 and a first signal feed-in terminal 22, the first radiator 21 is electrically connected to the ground surface 10, and the first signal feed-in terminal 22 is electrically connected to the first radiator 21. The position of the first RF feed-in signal terminal 11 is close to the endpoint of the first signal feed-in terminal 22. The first RF feed-in signal terminal 11 transmits the wireless signal to the first signal feed-in terminal 22, the first signal feed-in terminal 22 transmits the wireless signal to the first radiator 21, and the first radiator 21 transmits the wireless signal outward. In other words, the first antenna 20 is a planar inverted F antenna.

As shown in FIG. 1, the second antenna 30 includes a second radiator 31 and a second signal feed-in terminal 32, the second radiator 31 is electrically connected to the ground surface 10, and the second signal feed-in terminal 32 is electrically connected to the second radiator 31, and the position of the second RF feed-in signal terminal 12 is close to the endpoint of the second signal feed-in end 32. The second RF feed-in signal terminal 12 transmits the wireless signal to the second signal feed-in terminal 32, the second signal feed-in terminal 32 transmits the wireless signal to the second radiator 31, and the second radiator 31 transmits the wireless signal outward. In other words, the second antenna 30 is a planar inverted F antenna.

As shown in FIG. 1, the printed-type guiding structure 40 is located between the first antenna 20 and the second antenna 30, electrically connected to the ground surface 10, and includes a first hollow portion 41, a second hollow portion 42, and a protruding portion 43. As shown in FIG. 2 and FIG. 3, the first hollow portion 41 has an axis 411, a first end 412, a second end 413, a first side 414, and a second side 415, the second end 413 of the first hollow portion 41 is located at the opposite end of the first end 412 of the first hollow portion 41, and the second side 415 of the first hollow portion 41 is located at the opposite side of the first side 414 of the first hollow portion 41. The second hollow portion 42 has an axis 421, a first end 422, a second end 423, a first side 424, and a second side 425, the second end 423 of the second hollow portion 42 is located at the opposite end of the first end 422 of the second hollow portion 42, and the second side 425 of the second hollow portion 42 is located on the opposite side of the first side 424 of the second hollow portion 42. Both the first hollow portion 41 and the second hollow portion 42 are parallelograms, and an angle α between the axis 411 of the first hollow portion 41 and the axis 421 of the second hollow portion 42 is between 30° and 50°. The first end 412 of the first hollow portion 41 overlaps the first end 422 of the second hollow portion 42, and the protruding portion 43 is disposed between the outer side of the first side 414 of the first hollow portion 41 and the inner side of the first side 424 of the second hollow portion 42. The first side 424 of the second hollow portion 42 has a short arm 4241 extending from the protruding portion 43 to the second end 423 of the second hollow portion 42. The second side 425 of the second hollow portion 42 has a long arm 4251, and the long arm 4251 extends from the first end 422 of the second hollow portion 42 to the second end 423 of the second hollow portion 42. The sum of a length L1 of the short arm 4241 and a length L2 of the long arm 4251 is 0.2 to 0.3 times the wavelength of the operating frequency band.

Thereby, the antenna structure of the present invention can greatly increase the isolation between the first antenna

20 and the second antenna 30 through the structural configuration of the printed-type guiding structure 40, preventing interference between the signals emitted by the first antenna 20 and the second antenna 30, shortening the required distance between the first antenna 20 and the second antenna 30, and improving the flexibility of antenna placement design.

Furthermore, the present invention only needs to use printing technology to form the printed-type guiding structure 40 on the printed circuit board, and the effect of greatly increasing the isolation between the first antenna 20 and the second antenna 30 can be achieved without adding an additional three-dimensional structure, and no mold manufacturing is required, thereby effectively reducing manufacturing costs.

As shown in FIGS. 2 and 3, in a preferred embodiment, the sum of the length L1 of the short arm 4241 and the length L2 of the long arm 4251 is 0.25 times the wavelength of the operating frequency band, and this wavelength can provide better isolation between the first antenna 20 and the second antenna 30.

Preferably, the range of 0.25 times the wavelength of the operating frequency band is between 22-30 mm. It is found through testing that this wavelength range can provide better isolation between the first antenna 20 and the second antenna 30.

Preferably, the 0.25 times wavelength of the operating frequency band is 24 mm, and it is found through testing that this specific wavelength can provide more significant isolation between the first antenna 20 and the second antenna 30.

As shown in FIGS. 2 and 3, in a preferred embodiment, the length ratio of the short arm 4241 to the long arm 4251 is 2:3. It has been found through testing that this length ratio can further improve the isolation between the first antenna 20 and the second antenna 30. For example, when the operating frequency band is 2.4 GHz, based on the length ratio calculation, the preferred length of the short arm 4241 is 10.5 mm, and the preferred length of the long arm 4251 is 15.88 mm. However, the ideal value of the length should be converted based on the operating frequency band at that time, and is not limited thereto.

As shown in FIG. 2 and FIG. 3, in a preferred embodiment, the width W1 of the first hollow portion 41 is between 6-10 mm, and the length L3 of the first hollow portion 41 is between 9-11 mm. Preferably, the ideal value of the length L3 of the first hollow portion 41 is 9.5 mm, but it is not limited thereto. Therefore, limiting the size of the first hollow portion 41 helps to increase the isolation between the first antenna 20 and the second antenna 30.

As shown in FIGS. 2 and 3, in a preferred embodiment, the printed-type guiding structure 40 includes a first metal arm 44 and a second metal arm 45, the first metal arm 44 is electrically connected to the ground surface 10, and the second metal arm 45 is electrically connected to the ground surface 10. The first hollow portion 41 and the second hollow portion 42 are formed between the first metal arm 44 and the second metal arm 45, and the protruding part 43 is arranged on the inner side of the second metal arm 45 and close to the first end portion 451. Specifically, the antenna structure of the present invention uses printing technology to form metal structures such as the first metal arm 44, the second metal arm 45, and the protruding portion 43 on the printed circuit board so as to form the first hollow portion 41 and the second hollow portion 42 and other spaces, so that the first hollow portion 41 and the second hollow portion 42 will expose the dielectric layer of the printed circuit board, which can increase the isolation between the first antenna 20 and the second antenna 30 without any additional three-dimensional structure, and do not need to cast a mold for manufacturing, thereby effectively reducing the manufacturing cost.

As shown in FIG. 1 and FIG. 2, in a preferred embodiment, the first metal arm 44 is located between the first hollow portion 41 and the first antenna 20, and the second side 415 of the first hollow portion 41 is close to the first antenna 20. The second end 423 of the second hollow portion 42 is close to the second antenna 30, and a minimum distance between the first antenna 20 and the second antenna 30 is between 25 mm and 30 mm.

As shown in FIGS. 2 and 3, in a preferred embodiment, the first hollow portion 41 and the second hollow portion 42 are substantially rectangular, and the first end 412 and the second end 413 of the first hollow portion 41 are the short sides of the rectangle, the first side 414 and the second side 415 of the first hollow portion 41 are the long sides of the rectangle. The first end 422 and the second end 423 of the second hollow portion 42 are the short sides of the rectangle, and the first side 424 and the second side 425 of the second hollow portion 42 are long sides of a rectangle.

As shown in FIG. 2 and FIG. 3, in a preferred embodiment, the angle α between the axis 411 of the first hollow portion 41 and the axis 421 of the second hollow portion 42 is 45 degrees. Tests have shown that this specific angle can better isolate the first antenna 20 and the second antenna 30.

As shown in FIG. 2 and FIG. 3, in a preferred embodiment, the protruding portion 43 is trapezoidal. More specifically, the protruding portion 43 has an upper bottom 431, a lower bottom 432, and two waist sides 433, 434. The lower bottom 432 is aligned with the first side 424 of the second hollow portion 42, and one of the waist sides 433 is aligned with the first side 414 of the first hollow portion 41. Tests have shown that the trapezoidal protruding portion 43 can provide better isolation between the first antenna 20 and the second antenna 30.

As shown in FIGS. 2 and 3, when the protruding portion 43 is trapezoidal and the angle α is 45 degrees, the angle β between the lower bottom 432 and one of the waist sides 433 is 45 degrees, and the angle γ between the upper bottom 431 and one of the waist side 433 is 135 degrees, the upper bottom 431 is perpendicular to the other waist side 434, and the lower bottom 432 is perpendicular to the other waist side 434. In other words, the protruding portion 43 of the present embodiment is a right-angled trapezoid. As such, the effect of increasing the isolation between the first antenna 20 and the second antenna 30 is the most significant by matching the first hollow portion 41 and the second hollow portion 42 with the aforementioned angular relationship with the shape of the protruding portion 43.

Figure 4:
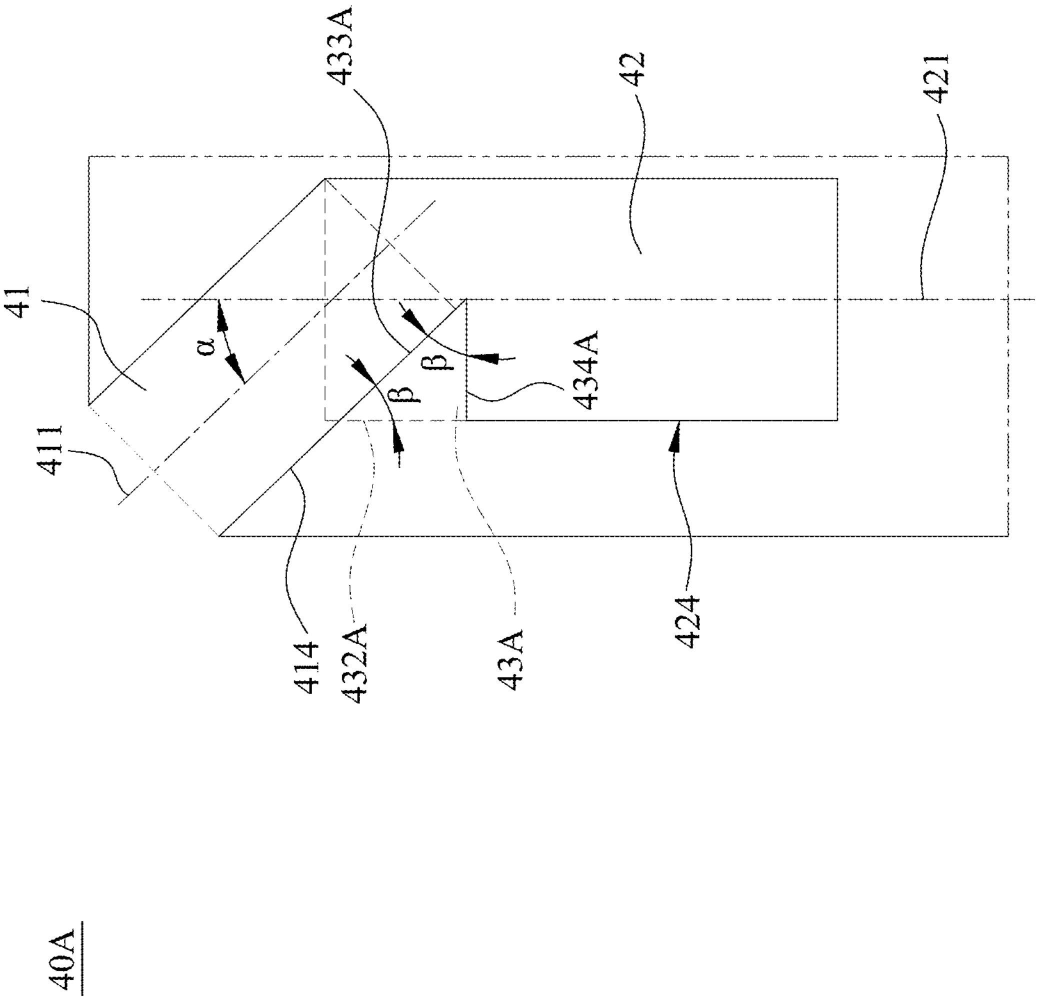
FIG. 4 is a structural schematic view of another embodiment of the printed-type guiding structure of the present invention.

FIG. 4 is a structural schematic view of another embodiment of a printed-type guiding structure 40A of the present invention. As shown in FIG. 4, in some embodiments, the protruding portion 43A is triangular in shape. More specifically, the protruding portion 43A has a bottom edge 433A and two waist sides 432A, 434A, wherein one waist side 432A is aligned with the first side 424 of the second hollow portion 42, and the bottom edge 433A is aligned with the first side 414 of the first hollow portion 41. When the protruding portion 43A is triangular and the angle α is 45 degrees, the isosceles 432A, 434A are perpendicular to each other, and the angle β between the bottom edge 433A and the isosceles 432A, 434A is 45 degrees, and the protruding portion 43A of this embodiment is isosceles right triangle. The trapezoidal protruding portion 43 and the triangular protruding portion 43A have the same effect in increasing the isolation between the first antenna 20 and the second antenna 30.

Figure 5:
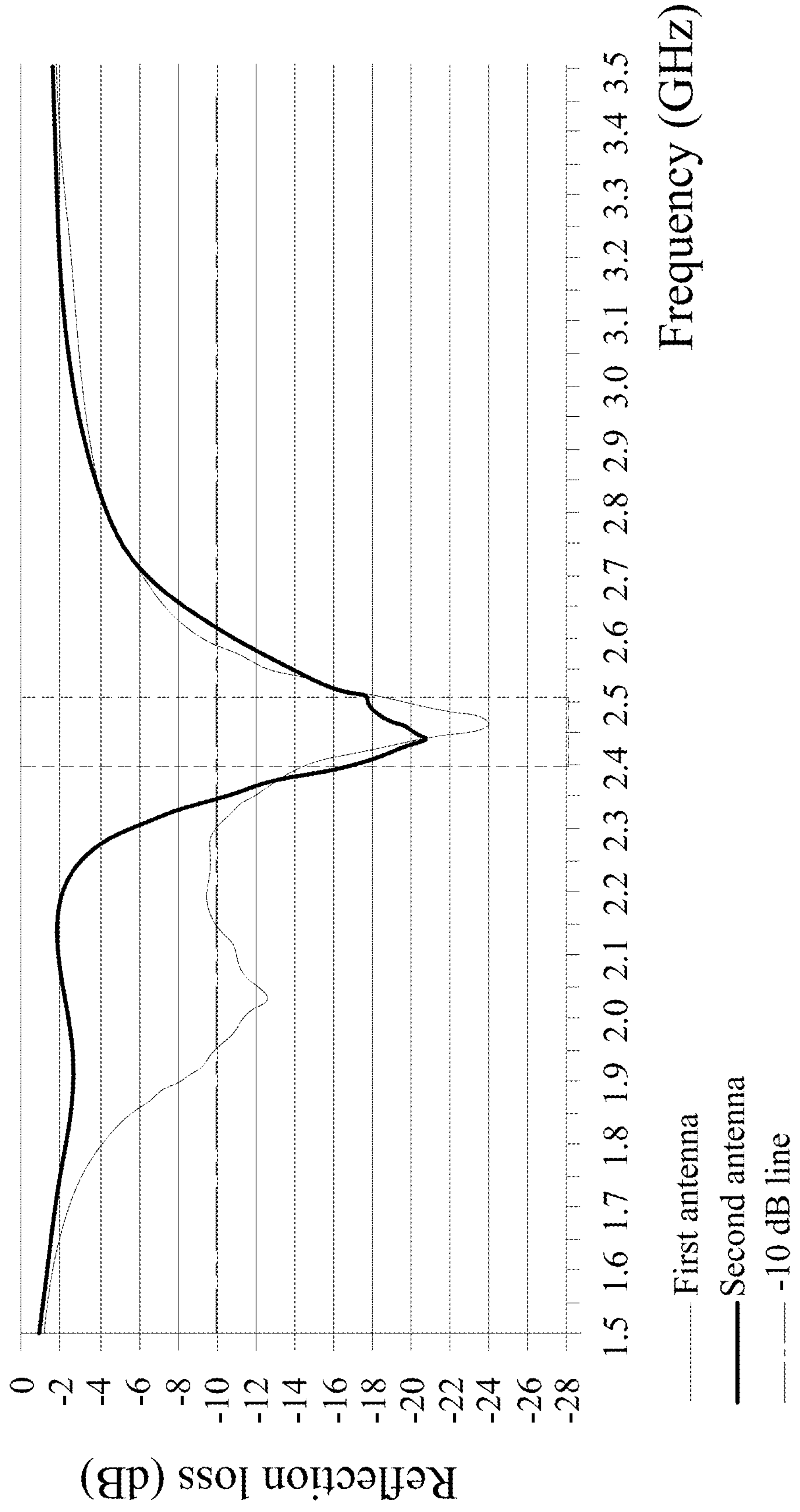
FIG. 5 is a graph of the return loss of the antenna structure of the present invention.

FIG. 5 is a graph of the return loss of the antenna structure of the present invention. As shown in FIG. 5, the return loss of the first antenna 20 and the second antenna 30 in the high frequency range between 2.4-2.5 GHz is lower than −10 dB. Therefore, the electromagnetic waves emitted by the first antenna 20 and the second antenna 30 in the high frequency range between 2.4-2.5 GHz have less energy loss when reflected back.

Figure 6:
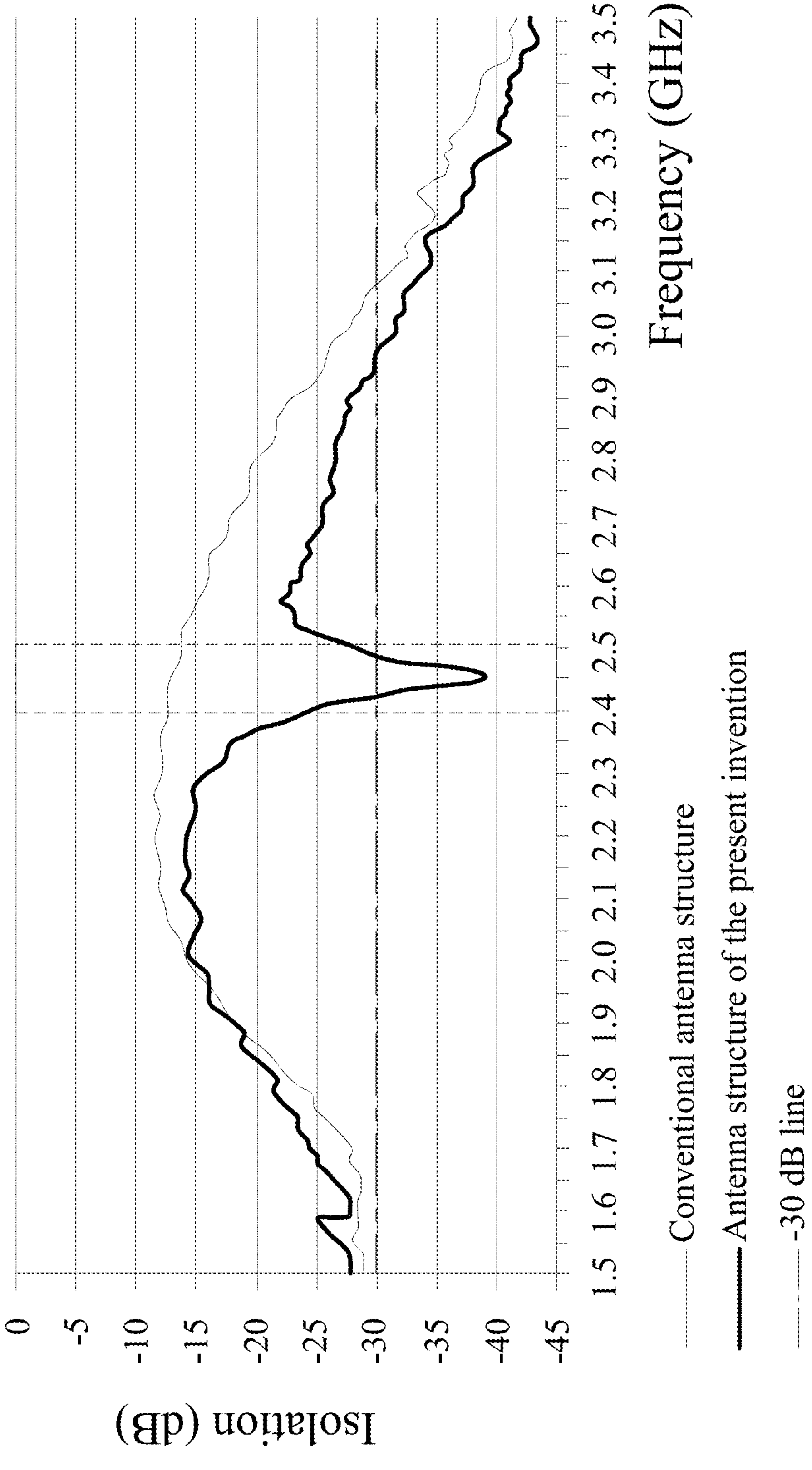
FIG. 6 is a graph showing the isolation of the conventional antenna structure and the antenna structure of the present invention.

FIG. 6 is a graph showing the isolation of the conventional antenna structure and the antenna structure of the present invention. The conventional antenna structure includes a ground surface 10, a first antenna 20, and a second antenna 30, but does not include a printed-type guiding structure 40. As shown in FIG. 6, in the high-frequency range between 2.4 and 2.5 GHz, since the conventional antenna structure does not have a printed-type guiding structure 40, the isolation between the first antenna 20 and the second antenna 30 is about −13.12 dB in the conventional antenna structure. As shown in FIG. 6, in the high-frequency range between 2.4 and 2.5 GHz, since the antenna structure of the present invention includes a printed-type guiding structure 40, the isolation between the first antenna 20 and the second antenna 30 of the antenna structure of the present invention is −31.96 dB. Compared with the conventional antenna structure, the antenna structure of the present invention can improve the isolation between the first antenna 20 and the second antenna 30 by about −23.84 dB (15-20%), the effect of avoiding the mutual interference of the signals transmitted by the first antenna 20 and the second antenna 30 is excellent, and the effect of shortening the required distance between the first antenna 20 and the second antenna 30 is even better. It can improve the flexibility of antenna placement design.

Figure 7:
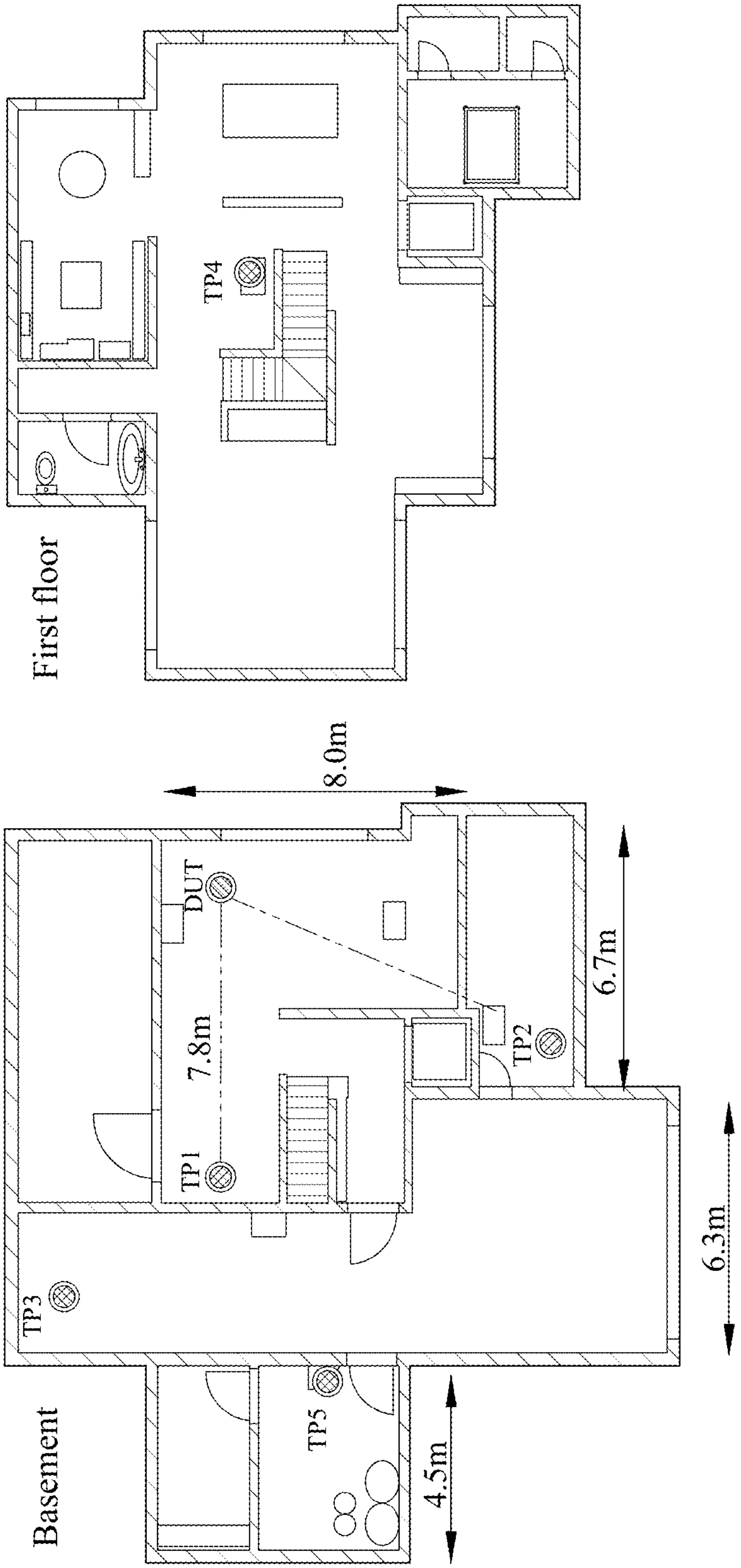
FIG. 7 is a schematic view of the relative positions of the object under test and the test points located in different indoor spaces or on different floors.

FIG. 7 is a schematic view of the relative positions of the device under test (DUT) and the test points TP1-TP5 located in different indoor spaces or on different floors. As shown in FIG. 7, the DUT is a wireless communication device, and is equipped with a conventional antenna structure or the antenna structure of the present invention. Four test points TP1, TP2, TP3 and TP5, are disposed in the four rooms in the basement, the test point TP4 is disposed near the stairs on the first floor. In the high-frequency range between 2.4-2.5 GHz, the test data results of the uploaded and downloaded packets between the DUT and each test point TP1-TP5 are shown in Table 1 below:

TABLE 1

| | Antenna structure of the invention | | Conventional antenna structure | |
|---|---|---|---|---|
| Test Point | Download packets (MB) | Upload packets (MB) | Download packets (MB) | Upload packets (MB) |
| TP1 | 171.36 | 165.10 | 147.07 | 147.29 |
| TP2 | 129.02 | 111.02 | 97.09 | 83.46 |
| TP3 | 104.42 | 88.64 | 88.87 | 54.77 |
| TP4 | 102.12 | 138.02 | 79.87 | 56.53 |
| TP5 | 87.56 | 60.04 | 61.63 | 47.99 |

As shown in Table 1, the amount of uploading and downloading packets between the wireless communication device (DUT) with the antenna structure of the present invention and each test point TP1-TP5 far exceeds that of the wireless communication device with the conventional antenna structure. The difference in the amount of upload and download packets between the device (DUT) and each test point TP1-TP5 is because: the printed-type guiding structure 40 can significantly increase the isolation between the first antenna 20 and the second antenna 30. Thus, the transmission efficiency of the antenna structure of the present invention is improved.

Although the present invention has been described with reference to the preferred embodiments thereof, it is apparent to those skilled in the art that a variety of modifications and changes may be made without departing from the scope of the present invention, which is intended to be defined by the appended claims.

What is claimed is:

1. An antenna structure for increasing isolation, comprising:

a ground surface;

a first antenna, electrically connected to the ground surface;

a second antenna, electrically connected to the ground surface; and a printed-type guiding structure, located between the first antenna and the second antenna, electrically connected to the ground surface, and comprising a first hollow portion, a second hollow portion, and a protruding portion; the first hollow portion having an axis, a first end, a second end, a first side and a second side, the second end of the first hollow portion being located at an opposite end of the first end of the first hollow portion, and the second side of the first hollow portion being located on an opposite side of the first side of the first hollow portion; the second hollow portion having an axis, a first end, a second end, a first side, and a second side, the second end of the second hollow portion being located at an opposite end of the first end of the second hollow portion, and the second side of the second hollow portion being located on an opposite side of the first side of the second hollow portion; the first hollow portion and the second hollow portion having a shape of parallelograms, the axis of the first hollow portion and the axis of the second hollow portion forming an angle between 30° and 50°, the first end of the first hollowed portion overlapping with the first end of the second hollowed portion, and the protruding portion being disposed between an outer side of the first side of the first hollow portion and an inner side of the first side of the second hollow portion;

wherein the first side of the second hollow portion has a short arm extending from the protruding portion to the second end of the second hollow portion, the second side of the second hollow portion has a long arm extending from the first end of the second hollow portion to the second end of the second hollow portion, and a total length of the short arm and the long arm is 0.2 to 0.3 times a wavelength of an operating frequency band.

2. The antenna structure for increasing isolation according to claim 1, wherein the total length of the short arm and the long arm is 0.25 times the wavelength of the operating frequency band.

3. The antenna structure for increasing isolation according to claim 2, wherein a range of 0.25 times the wavelength of the operating frequency band is between 22 mm and 30 mm.

4. The antenna structure for increasing isolation according to claim 3, wherein 0.25 times the wavelength of the operating frequency band is 24 mm.

5. The antenna structure for increasing isolation according to claim 1, wherein a length ratio of the short arm to the long arm is 2:3.

6. The antenna structure for increasing isolation according to claim 1, wherein the protruding portion is trapezoidal-shaped or triangular-shaped.

7. The antenna structure for increasing isolation according to claim 1, wherein the angle between the axis of the first hollow portion and the axis of the second hollow portion is 45 degrees.

8. The antenna structure for increasing isolation according to claim 1, wherein the first hollow portion has a width between 6 mm and 10 mm.

9. The antenna structure for increasing isolation according to claim 1, wherein the first hollow portion has a length between 9 mm and 11 mm.

10. The antenna structure for increasing isolation according to claim 1, wherein the printed-type guiding structure comprises a first metal arm and a second metal arm, the first metal arm is electrically connected to the ground surface, and the second metal arm is electrically connected to the ground surface; the first hollow portion and the second hollow portion are formed between the first metal arm and the second metal arm, and the protruding portion is arranged on an inner side of the second metal arm and close to a first end of the second metal arm.

* * * * *